(12) United States Patent
Kang et al.

(10) Patent No.: US 9,965,109 B2
(45) Date of Patent: May 8, 2018

(54) TOUCH SCREEN DRIVER

(71) Applicant: LG Display Co., Ltd., Seoul (KR)

(72) Inventors: Hyeongwon Kang, Seoul (KR); Beomjin Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 14 days.

(21) Appl. No.: 14/291,283

(22) Filed: May 30, 2014

(65) Prior Publication Data

US 2014/0354592 A1    Dec. 4, 2014

(30) Foreign Application Priority Data

May 31, 2013 (KR) .................. 10-2013-0062442

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
CPC .......... G06F 3/038; G06F 3/041; G06F 3/045; G06F 3/044; G06F 3/0418
USPC ................................. 345/173–174
See application file for complete search history.

(56) References Cited

U.S. PATENT DOCUMENTS

| | | | |
|---|---|---|---|
| 2008/0158175 A1* | 7/2008 | Hotelling | G06F 3/0418 345/173 |
| 2011/0186359 A1 | 8/2011 | Chen et al. | |
| 2011/0193817 A1* | 8/2011 | Byun et al. | 345/174 |
| 2011/0261005 A1 | 10/2011 | Joharapurkar et al. | |
| 2013/0057493 A1* | 3/2013 | Hwang | G06F 3/0418 345/173 |
| 2013/0076675 A1* | 3/2013 | Shin et al. | 345/173 |
| 2014/0292705 A1* | 10/2014 | Tan et al. | 345/174 |

FOREIGN PATENT DOCUMENTS

| | | |
|---|---|---|
| CN | 102147678 A | 8/2011 |
| CN | 102236489 A | 11/2011 |
| EP | 2533137 A2 | 12/2012 |
| TW | 201128498 A | 8/2011 |

OTHER PUBLICATIONS

First Notification of Office Action from the State Intellectual Property Office of China dated Sep. 2, 2016 in counterpart Chinese application No. 201410235966.3. (U.S. Application Nos. 2013/076675 and 2013/057493 are already of record.).

* cited by examiner

*Primary Examiner* — Abdul-Samad A Adediran
(74) *Attorney, Agent, or Firm* — Morgan, Lewis & Bockius LLP

(57) ABSTRACT

A touch screen driver includes a touch screen comprising Tx channels, Rx channels crossing the Tx channels, and sensor nodes formed at the crossings of the Tx channels and the Rx channels; a Tx driving circuit for supplying a Tx driving pulse to the Tx channels; an Rx driving circuit comprising an offset charge compensation circuit that equally compensates for the amount of offset charge included in the voltages of the sensor nodes supplied through the Rx channels and a sampling circuit that samples the offset-compensated voltages of the sensor nodes in response to an Rx sampling clock and converts the sampled voltages into digital data; and a touch controller that analyzes the digital data input from the Rx driving circuit by a preset touch recognition algorithm and outputs touch data including coordinate information of a touch position.

8 Claims, 7 Drawing Sheets

TOUCH SCREEN DRIVER

This application claims the benefit of Korea Patent Application No. 10-2013-0062442 filed on May 31, 2013, which is incorporated herein by reference for all purposes as if fully set forth herein.

BACKGROUND OF THE INVENTION

Field of the Invention

This document relates to a touch screen driver.

Discussion of the Related Art

User interface (UI) is configured so that users are able to communicate with various electric and electronic devices and thus can easily control the devices as they desire. Examples of the user interface include a keypad, a keyboard, a mouse, an on-screen display (OSD), and a remote controller having an infrared communication function or a radio frequency (RF) communication function. User interface technologies have continuously evolved to increase user's sensibility and handling convenience. The user interface has been recently developed to touch UI, voice recognition UI, 3D UI, etc.

The touch UI has been necessarily used in portable information devices, and has been expanded to the use of home appliances. As an example of a touch screen for implementing the touch UI, mutual capacitance touch screens are in the spotlight which can sense proximity input as well as touch input and also recognize respective multi-touch (or multi-proximity) inputs.

A mutual capacitance touch screen comprises Tx lines, Rx lines crossing the Tx lines, and sensor nodes formed at the crossings of the Tx lines and the Rx lines. Each of the sensor nodes has a mutual capacitance. A touch screen driver for driving the mutual capacitance touch screen supplies a driving signal to the Tx lines, and receives charges of the touch sensors through the Rx lines. A touch screen driver senses changes in the voltage charged to the sensor nodes before and after touch (or proximity) input to decide whether or not a conductive material touches or approaches the touch screen and to decide where the touch or proximity input occurs. To sense the voltage charged in the sensor nodes, a Tx driving circuit applies a driving pulse to the Tx lines, and an Rx driving circuit samples small voltage changes at the sensor nodes in synchronization with the driving pulse and performs analog-to-digital conversion.

The Tx lines and Rx lines of the touch screen are typically routed on an FPR=CB (Flexible Printed Circuit Board) and connected to the touch IC, and therefore each Tx or Rx channel has a different value of load resistance R and parasitic capacitance C, resulting in a different RC delay value. Because the driving pulse applied to the Tx lines is noisy and each Tx or Rx channel has a different RC delay, each channel requires a different amount of offset charge to determine whether or not a touch is present. As the amount of offset charge to be applied varies with a touch position on the touch screen, the touch SNR (signal to noise ratio) varies with position, resulting in low touch reliability. For example, when the same level of voltage is applied to the sensor nodes from a first position on the touch screen and a second position on the touch screen having a smaller RC delay than the first position, a conventional touch screen driver, which has a different amount of offset charge depending on positions can determine that the second position is a touch point and the first position is a non-touch point. In order to eliminate touch differences between touch positions on the touch screen, it is necessary to eliminate differences in the amount of offset charge caused by different RC delays in different channels.

SUMMARY OF THE INVENTION

Accordingly, the present invention is directed to a touch screen driver that substantially obviates one or more of the problems due to limitations and disadvantages of the related art.

An object of the present invention is to provide a touch screen driver which ensures touch reliability by eliminating differences in the amount of offset charge between different channels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch screen driver comprises a touch screen comprising Tx channels, Rx channels crossing the Tx channels, and sensor nodes formed at the crossings of the Tx channels and the Rx channels; a Tx driving circuit for supplying a Tx driving pulse to the Tx channels; an Rx driving circuit comprising an offset charge compensation circuit that equally compensates for the amount of offset charge included in the voltages of the sensor nodes supplied through the Rx channels and a sampling circuit that samples the offset-compensated voltages of the sensor nodes in response to an Rx sampling clock and converts the sampled voltages into digital data; and a touch controller that analyzes the digital data input from the Rx driving circuit by a preset touch recognition algorithm and outputs touch data including coordinate information of a touch position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
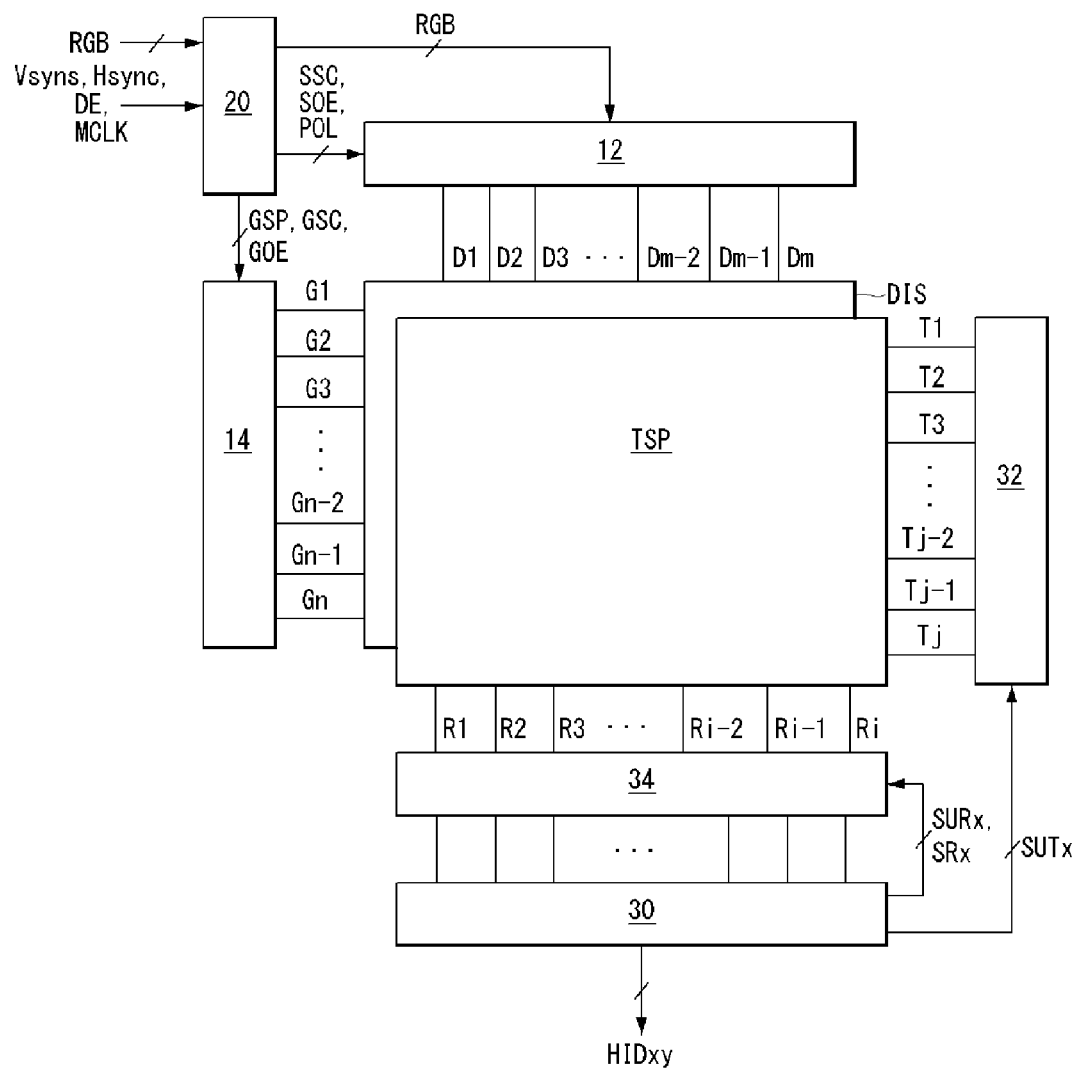
FIG. 1 is a block diagram showing a display device according to an exemplary embodiment of the present invention.

Hereinafter, an implementation of this document will be described in detail with reference to the attached drawings. Throughout the specification, like reference numerals denote substantially like components. In the following description, detailed descriptions of related known functions or elements that may unnecessarily make the gist of the present invention obscure will be omitted. In the following description, a Tx channel can be used in place of a Tx line, and an Rx channel can be used in place of an Rx line.

Figure 2:
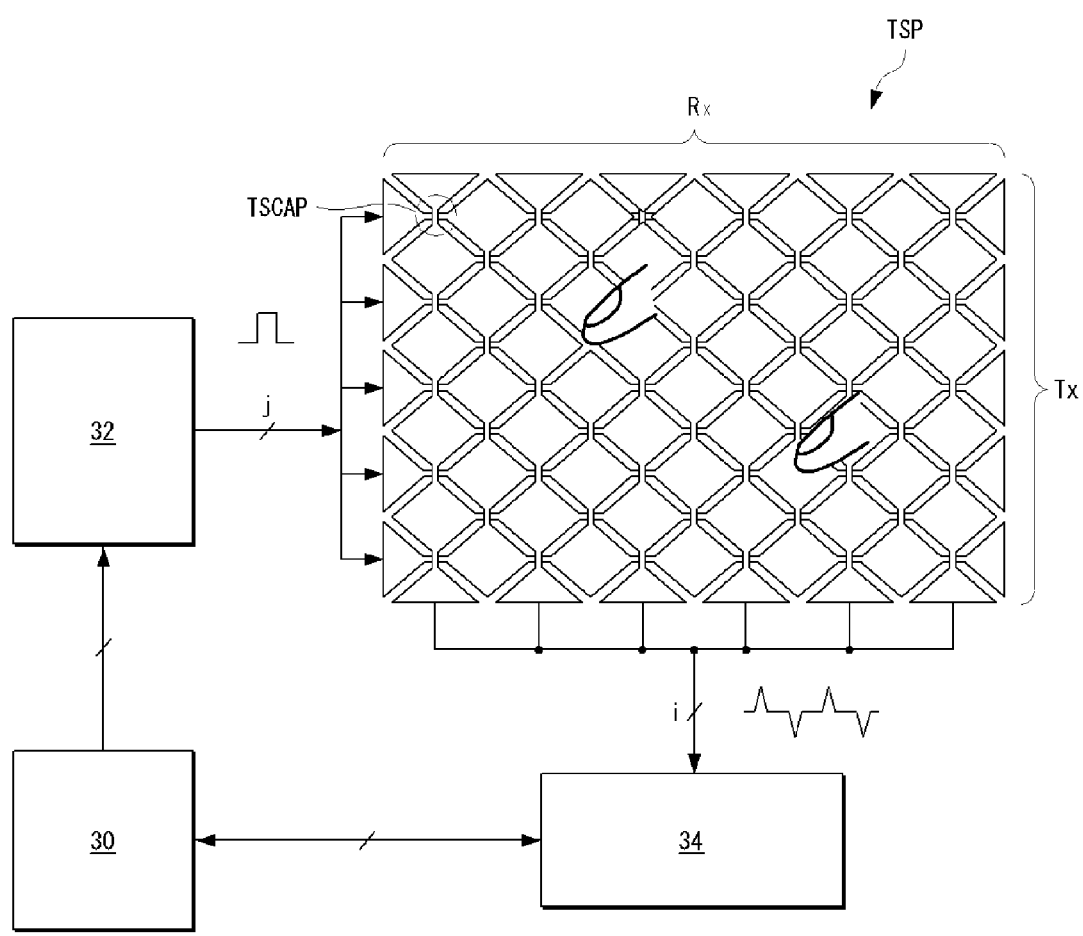
FIG. 2 shows a touch screen driver of FIG. 1.
Figure 3:
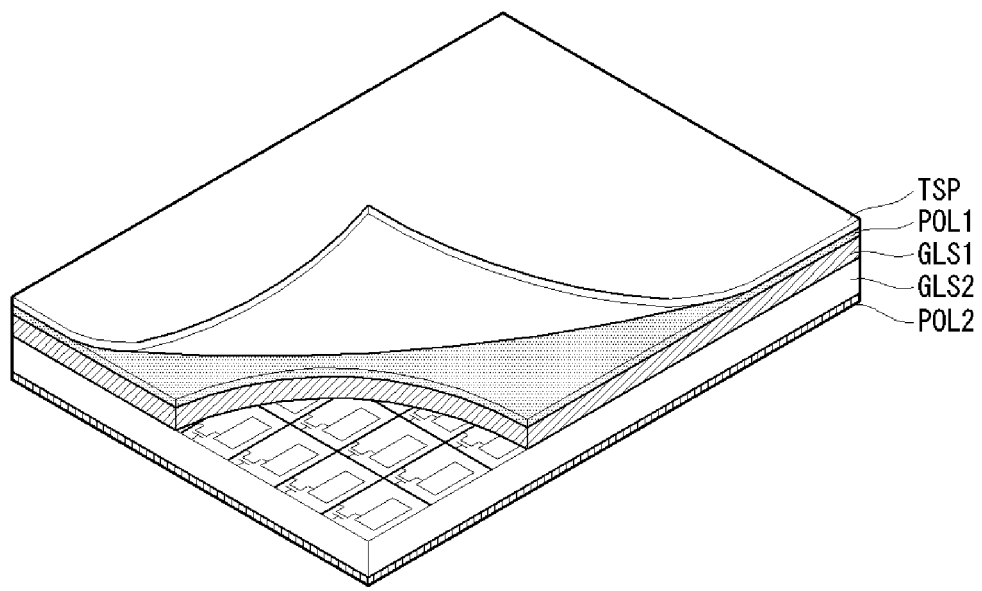
FIGS. 3 to 5 are views showing a touch screen and a display panel according to various exemplary embodiments.
Figure 4:
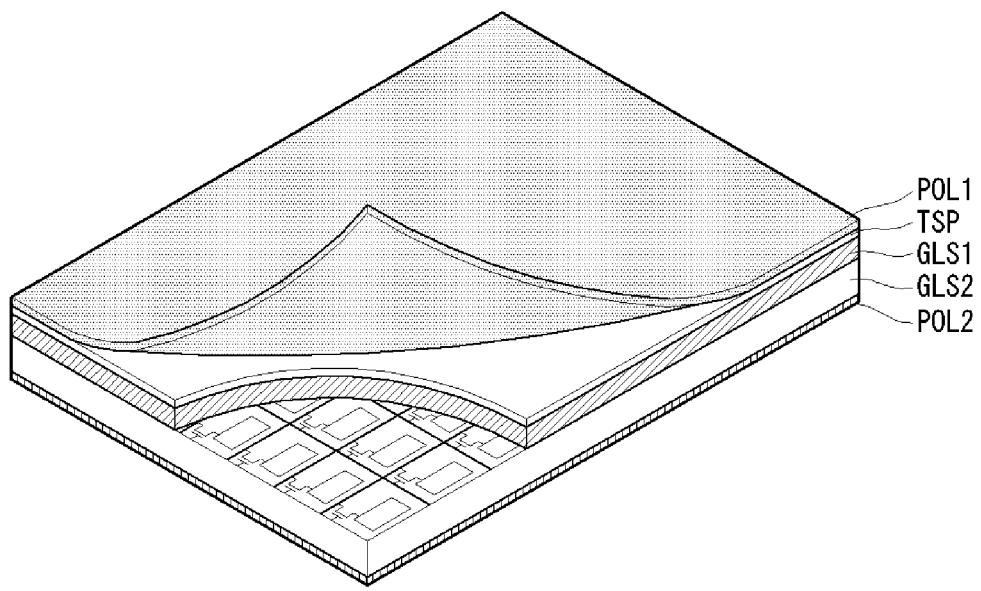
Figure 5:
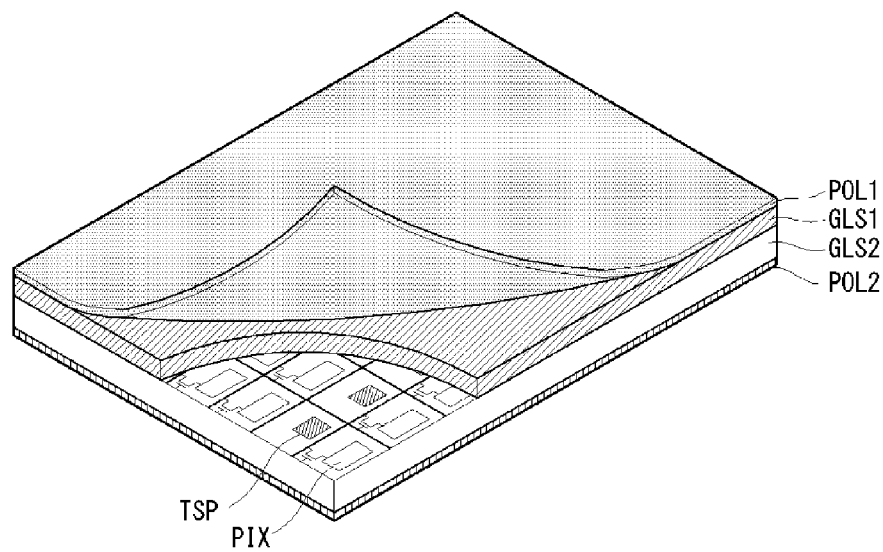

FIG. 1 is a block diagram showing a display device according to an exemplary embodiment of the present invention. FIG. 2 shows a touch screen driver of FIG. 1. FIGS. 3 to 5 are views showing a touch screen and a display panel according to various exemplary embodiments Referring to FIGS. 1 and 2, a display device according to an exemplary embodiment of the present invention comprises a display panel DIS, a display driving circuit 12 and 14, a timing controller 20, a touch screen TSP, a touch screen driving circuit 32 and 34, and a touch controller 30.

The display device of the present invention may be implemented as a flat panel display device, such as a liquid crystal display (LCD), a field emission display (FED), a plasma display panel (PDP), an organic light emitting display (OLED), or an electrophoresis (EPD). In an exemplary embodiment that follows, it should be noted that, although a liquid crystal display device will be described as an example of the flat panel display device, the display device of the present invention is not limited to the liquid crystal display device.

A liquid crystal layer is formed between two substrates of a display panel DIS. The lower substrate of the display panel DIS comprises a plurality of data lines D1 to Dm (m is a natural number), a plurality of gate lines (or scan lines) G1 to Gn (n is a natural number) crossing the data lines D1 to Dm, a plurality of TFTs (Thin Film Transistors) formed at the crossings of the date lines D1 to Dm and the gate lines G1 to Gn, a plurality of pixel electrodes for charging to liquid crystal cells, and a storage capacitor connected to the pixel electrodes and for maintaining the voltage of the liquid crystal cells.

Pixels of the display panel DIS are formed in pixel areas defined by the data lines D1 to Dm and the gate lines G1 to Gm and arranged in a matrix. The liquid crystal cell of each pixel is driven by an electric field produced by the difference between the data voltage applied to the pixel electrodes and a common voltage applied to a common electrode, and adjust the amount of transmission of incident light. The TFTs are turned on in response to a gate pulse from the gate lines G1 to Gn, and supplies a voltage from the data lines D1 to Dm to the pixel electrodes of the liquid crystal cells.

The upper substrate of the display panel DIS may comprise a black matrix, color filters, etc. The lower substrate of the display panel DIS may be configured in a COT (color filter on TFT) structure. In this instance, the black matrix and the color filters may be formed on the lower substrate of the display panel DIS.

Polarizing plates are respectively attached to the upper and lower substrates of the display panel DIS. An alignment layer for setting a pre-tilt angle of liquid crystals is formed on the inner surfaces contacting the liquid crystals. A column spacer may be formed between the upper and lower substrates of the display panel DIS to keep cell gaps of the liquid crystal cells constant.

A backlight unit may be placed below the back surface of the display panel DIS. The backlight unit is implemented as an edge type backlight unit or a direct type backlight unit to irradiate light to the display panel DIS. The display panel 100 may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display driving circuit comprises a data driving circuit 12 and a scan driving circuit 14, and applies a video data voltage of an input image to the pixels. The data driving circuit 12 converts digital video data RGB received from the timing controller 20 into positive and negative analog gamma compensation voltages and outputs a data voltage. The data voltage is supplied to the data lines D1 to Dm. The scan driving circuit 14 sequentially supplies the gate pulse (or scan pulse) synchronized with the data voltage to the gate lines G1 to Gn and selects lines of the display panel DIS to which the data voltage will be applied.

The timing controller 20 receives timing signals, such as a vertical synchronization signal vsync, a horizontal synchronization signal Hsync, a data enable signal DE, and a main clock MCLK from an external host system, and generates a data timing control signal and a scan timing control signal for respectively controlling operation timings of the data driving circuit 12 and the scan driving circuit 14. The scan timing control signal comprises a gate start pulse GSP, a gate shift clock, a gate output enable signal GOE, etc. The data timing control signal comprises a source sampling clock SSC, a polarity control signal POL, a source output enable signal SOE, etc.

As shown in FIG. 3, the touch screen TSP may be attached on the upper polarizing plate POL1 of the display panel DIS. Alternatively, as shown in 4, the touch screen TSP may be formed between the upper polarizing plate POL1 and the upper substrate GLS1. Alternatively, as shown in FIG. 5, sensor nodes TSCAP of the touch screen TSP may be formed on the lower substrate, along with a pixel array within the display panel DIS in an in-cell manner. In FIGS. 3 to 5, "PIX" denotes the pixel electrode of a liquid crystal cell, and "GLS2" denotes the lower substrate, and "POL" denotes the lower polarizing plate.

The touch screen TSP comprises Tx lines T1 to Tj (j is a positive integer less than n), Rx lines R1 to Ri crossing the Tx lines T1 to Tj (i is a positive integer less than m), and i×j sensor nodes TSCAP formed at the crossings of the Tx lines T1 to Tj and the Rx lines R1 to Ri.

The touch screen driving circuit comprises a Tx driving circuit 32 and an Rx driving circuit 34. The touch screen driving circuit supplies a driving pulse to the Tx lines T1 to Tj and senses the voltages of the sensor nodes TSCAP through the Rx lines R1 to Ri and converts them into digital data. The Tx driving circuit 32 and the Rx driving circuit 34 may be integrated within a single ROIC (Read-out IC).

The Tx driving circuit 32 selects a Tx channel in response to a Tx setup signal SUTx input from a touch controller 30 and supplies a driving pulse to the Tx lines T1 to Tj connected to the selected Tx channel. If j sensor nodes TSCAP are connected to one Tx line, driving pulses are consecutively supplied to the Tx line j times, and then driving pulses are supplied to the next Tx line in the same manner.

The Rx driving circuit 34 selects an Rx channel to receive the voltages of the sensor nodes TSCAP in response to a setup signal SURx input from the touch controller 30. The Rx driving circuit 34 receives the voltages of the sensor nodes TSCAP through the Rx lines R1 to Ri connected to the selected Rx channel. The Rx driving circuit 34 equally compensates for the amount of offset charge included in the voltages of the sensor nodes TSCAP supplied through the Rx channels by a predetermined reference value, in order to eliminate differences in the amount of offset charge caused by different RC delays in different channels. The Rx driving circuit 34 stores the offset-compensated voltages of the sensor nodes TSCAP in a sampling capacitor (CFB of FIG. 7) and samples the voltages of the sensor nodes TSCAP, in response to an Rx sampling clock SRx input from the touch controller 30. The Rx driving circuit 34 converts the sampled voltages of the sensor nodes TSCAP into touch raw data, which is digital data, and transmits them to the touch controller 30.

The touch controller 30 is connected to the Tx driving circuit 32 and the Rx driving circuit 34 over an interface, such as an I2C bus, an SPI (serial peripheral interface), and a system bus. The touch controller 30 supplies setup signals SUTx and SURx to the Tx driving circuit 32 and the Rx driving circuit 34 to select a Tx channel through which a driving pulse STx will be output and an Rx channel through which the voltages of the sensor nodes TSCAP will be read. The touch controller 30 supplies the Rx sampling clock SRx to the Rx driving circuit 34 to control sampling switches of a sampling circuit embedded in the Rx driving circuit 34, and controls the voltage sampling timing of the sensor nodes TSCAP.

The touch controller 30 supplies an ADC clock to an analog-to-digital converter (hereinafter, "ADC") embedded in the Rx driving circuit 34, and controls the operation timing of ADC.

The touch controller 30 analyzes the touch raw data input from the Rx driving circuit 34 by a preset touch detection algorithm, estimates the coordinate values of any touch raw data equal to or more than a given value and out puts touch data including coordinate information. The touch data output from the touch controller 30 is transmitted to an external host system. The touch controller 30 may be implemented as an MCU (Micro Controller Unit).

The host system may be connected to an external video source, for example, a navigation system, a set-top box, a DVD player, a Blu-ray player, a personal computer (PC), a home theater system, a broadcast receiver, and a phone system, and receive image data from the external video source. The host system comprises a system on chip (SoC) with a scaler embedded in it, and converts the image data from the external video source into a format suitable for displaying on the display panel DIS. Also, the host system executes an application program associated with the coordinate values of the touch data input from the touch controller 30.

Figure 6:
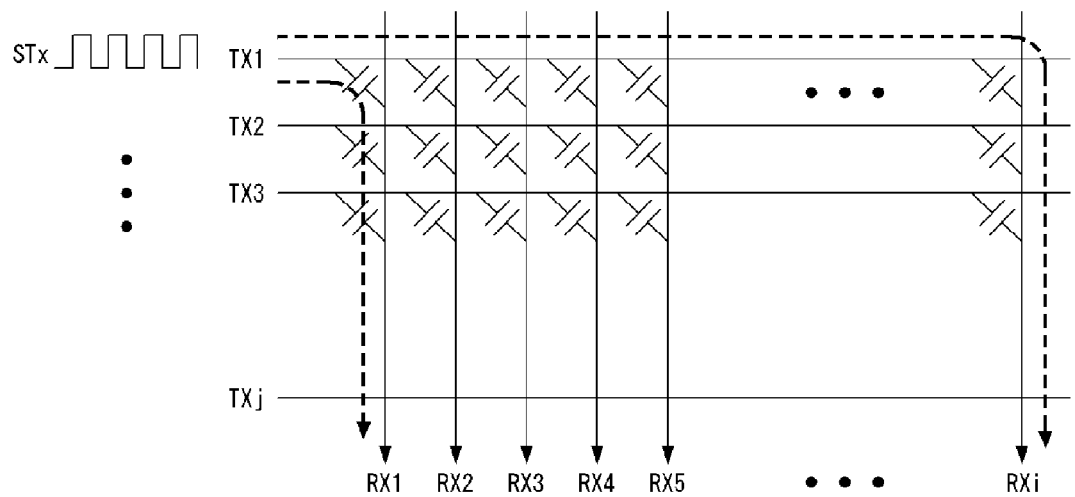
FIG. 6 shows RC delay differences produced between Rx channels on a touch screen TSP.
Figure 7:
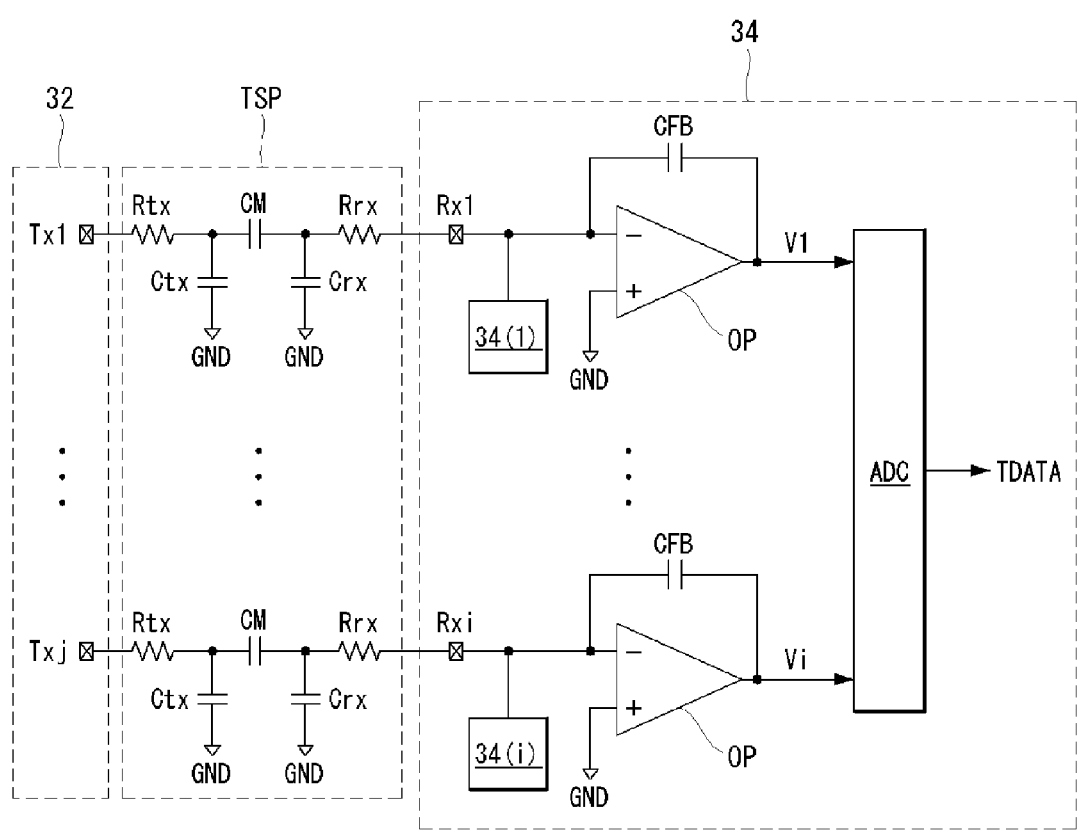
FIG. 7 shows an equivalent circuit diagram of an Rx driving circuit comprising an offset charge compensation circuit, together with a touch screen.
Figure 8:
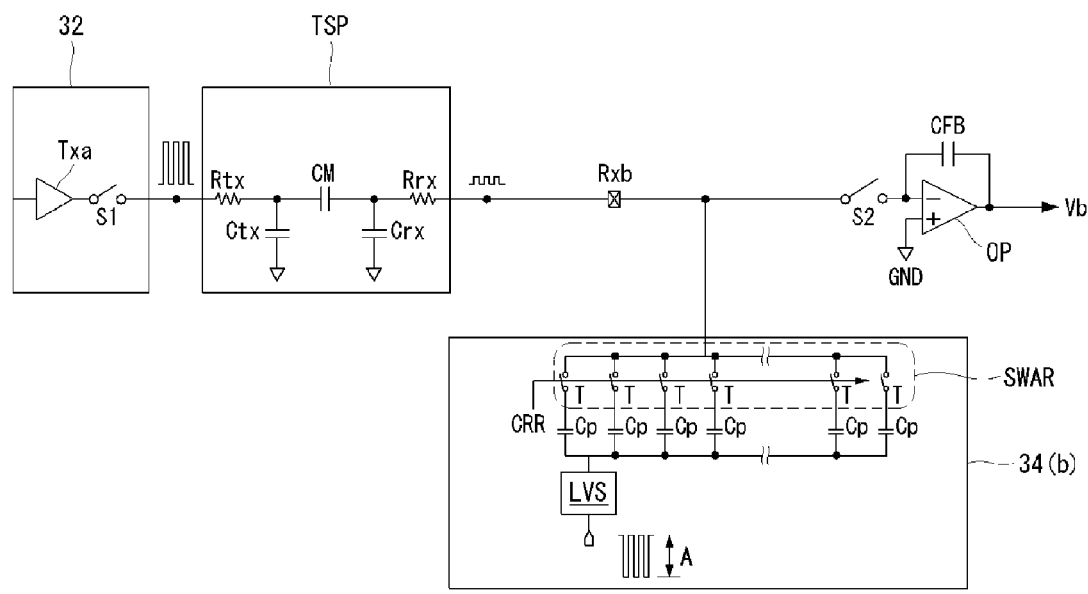
FIG. 8 illustrates an equivalent circuit diagram of the offset charge compensation circuit of FIG. 7 by way of example.
Figure 9:
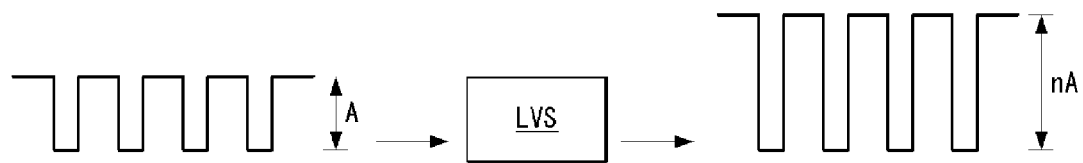
FIG. 9 shows the function of a level shifter of FIG. 8.
Figure 10:
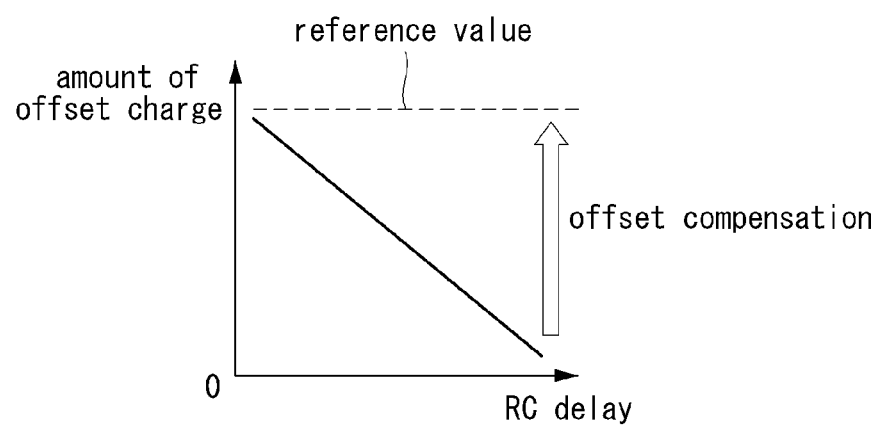
FIG. 10 shows the operational effect of the offset charge compensation circuit.

FIG. 6 shows RC delay differences produced between Rx channels on a touch screen TSP. FIG. 7 shows an equivalent circuit diagram of an Rx driving circuit comprising an offset charge compensation circuit, together with a touch screen. FIG. 8 illustrates an equivalent circuit diagram of the offset charge compensation circuit of FIG. 7 by way of example. FIG. 9 shows the function of a level shifter of FIG. 8. FIG. 10 shows the operational effect of the offset charge compensation circuit.

As shown in FIGS. 7 and 8, the touch screen driver of the present invention comprises a Tx driving circuit 32, a touch screen TSP, and an RX driving circuit 34.

The Tx driving circuit 32 comprises a plurality of Tx channels Tx1 to Txj. Each of the Tx channels Tx1 to Txj may comprise a first switch S1 that is switched in response to an setup signal SUTx, as shown in FIG. 8.

Upon receiving a Tx driving pulse from the Tx driving circuit 32, the touch screen TSP outputs, through the Rx channels, the voltages of the sensor nodes connected to the Tx channels through which the Tx driving pulse is applied. In FIGS. 7 and 8, "Ctx" denotes the parasitic capacitance of a Tx line, "CRx" denotes the parasitic capacitance of an Rx line, "Rtx" denotes the load resistance of the Tx line, and "CM" denotes the mutual capacitance between the sensor nodes.

The Rx driving circuit 34 comprises an offset charge compensation circuit that equally compensates for the amount of offset charge included in the voltages of the sensor nodes supplied through the Rx channels by a predetermined reference value and a sampling circuit that samples the offset-compensated voltages of the sensor nodes in response to an Rx sampling clock and converts the sampled voltages V1 to Vi into digital data.

As shown in FIG. 7, offset charge compensation circuits 34(1) to 34(i) may be connected to the respective Rx channels on a one-to-one basis. Alternatively, although not shown, one offset charge compensation circuit may be connected to each Rx channel group consisting of two or more Rx channels. That is, one offset charge compensation circuit may be connected to a plurality of Rx channels.

The sampling circuit comprises sampling switches S2 respectively connected to at least one Rx channel (one or more Rx channels), operation amplifiers OP respectively connected to the sampling switches s2, and an analog-to-digital converter ADC for sequentially receiving output from the operation amplifiers OS.

As shown in FIG. 8, a sampling switch S2 is connected between the Rx channel Rxb and the inverting input terminal (−) of an operation amplifier O. A sampling capacitor CFB is connected between the inverting input terminal (−) and output terminal of the operation amplifier OP. The non-inverting input terminal (+) of the operation amplifier OP is connected to a ground voltage source GND, and the output terminal of the operation amplifier OP is connected to the analog-to-digital converter ADC. The analog-to-digital converter ADC receives a sampled voltage Vb stored in the sampling capacitor CFB of the operation amplifier OP.

As shown in FIG. 8, each of the offset charge compensation circuits 34(1) to 34(i) comprises an input terminal into which a compensation pulse having the opposite phase to that of a Tx driving pulse is input, a plurality of compensation capacitors Cp connected in parallel to the input terminal, and a plurality of switches T, one end of which being connected in series to the compensation capacitors Cp and the other end of which being connected commonly to at least one of the Rx channels.

The amount required to compensate for the amount of offset charge by a predetermined reference value is determined depending on the number of switches to be conducted among the switches T. The switches T are switched on or off according to a predetermined charge control register value CRR based on parameter information on the touch screen TSP. The parameter information on the touch screen TSP includes the parasitic capacitance Ctx of a Tx line, the parasitic capacitance Crx of a Rx line, the load resistance Rtx of a Tx line, the load resistance Rrx of an Rx line, and the mutual capacitance CM between the sensor nodes.

As the parameter information on the touch screen TSP varies with a touch position on the touch screen, the amount of offset charge dependent on RC delays varies with a touch position on the touch screen. For example, if the RC delay for a second position on the touch screen is smaller than that for a first position on the touch screen, the amount of offset charge for the first position is larger than that for the second position, and accordingly the amount required to compensate for the amount of offset charge for the first position is larger than that for the second position. Once the design specification of the touch screen TSP is determined, parameter information for each position may be obtained in advance. The amount of compensation for each position is determined based on the parameter information and the charge control register value CRR is determined based on the determined amount of compensation. The larger the required amount of compensation, the greater the number of switches T to be switched on according to the charge control register value CRR. On the contrary, the smaller the required amount of compensation, the less the number of switches T to be switched on according to the charge control register value CRR.

Each of the offset charge compensation circuits 34(10 to 34(i) may further comprise a level shifter, as shown in FIG. 8. The level shifter LVS is connected between the input terminal into which the compensation pulse is input and the compensation capacitors, and level-shifts the amplitude A of the compensation pulse. For example, the amplitude A of the compensation pulse may be increased n times (nA) by the level shifter LVS, as shown in FIG. 9.

The amount of offset charge and the amount of compensation of it are defined by amplitude of compensation pulse*combined capacitance of compensation capacitors. Accordingly, the number of compensation capacitors to be conducted can be reduced by 1/n by increasing the amplitude of the compensation pulse n times. Therefore, the amplitude of the compensation pulse can be properly adjusted by the level shifter LVS, thus reducing the required number of compensation capacitors Cp and the required number of switches T.

As shown in FIG. 10, each of the offset charge compensation circuits 34(1) to 34(i) serves to equally compensate for the amount of offset charge included in the voltages of the sensor nodes supplied through the Rx channels by the reference value indicated by a dotted line. Consequently, touch data differences depending on positions on the touch screen TSP can be eliminated, resulting in an increase in touch SNR.

It will be apparent to those skilled in the art that various modifications and variations can be made in the [TITLE] of the present invention without departing from the spirit or scope of the invention. Thus, it is intended that the present invention cover the modifications and variations of this invention provided they come within the scope of the appended claims and their equivalents.

What is claimed is:
1. A touch screen driver, comprising:
    a touch screen including Tx channels, Rx channels crossing the Tx channels, and sensor nodes formed at the crossings of the Tx channels and the Rx channels;
    a Tx driving circuit to supply a Tx driving pulse to the Tx channels;
    an Rx driving circuit including:
        an offset charge compensation circuit that equally compensates for an amount of offset charge included in voltages at the sensor nodes supplied through the Rx channels; and
        a sampling circuit that, in response to an Rx sampling clock, samples the voltages at the sensor nodes which have been offset-compensated by the offset charge compensation circuit, and converts the sampled voltages into digital data,
    wherein the offset charge compensation circuit is connected to the Rx channels between the sensor nodes and the sampling circuit such that offset compensations have been applied to the voltages sampled by the sampling circuit; and
    a touch controller that analyzes the digital data input from the Rx driving circuit by a preset touch recognition algorithm and outputs touch data including coordinate information of a touch position,
    wherein the offset charge compensation circuit comprises:
        an input terminal into which a compensation pulse having an opposite phase to that of a Tx driving pulse is input;
        a plurality of compensation capacitors connected in parallel to the input terminal;
        a plurality of switches, one end of which being connected in series to the compensation capacitors and another end of which being connected commonly to at least one of the Rx channels; and
        a level shifter that is connected in series between the input terminal and the compensation capacitors and level-shifts an amplitude of the compensation pulse,
    wherein an amount required to compensate for the amount of offset charge by a predetermined reference value is determined depending on a number of switches to be conducted among the switches.

2. The touch screen driver of claim 1, wherein the offset charge compensation circuit is connected on a one-to-one basis to each Rx channel or connected to a plurality of Rx channels.

3. The touch screen driver of claim 1, wherein the switches are switched on or off according to a predetermined charge control register value based on parameter information on the touch screen.

4. The touch screen driver of claim 1, wherein the amount required to compensate varies with a touch position on the touch screen.

5. The touch screen driver of claim 1, wherein the sampling circuit includes an analog-to-digital converter that receives the offset-compensated voltages at the sensor nodes from the offset charge compensation circuit.

6. The touch screen driver of claim 1, wherein the level shifter is configured to increase the amplitude of the compensation pulse by 'n' times, and output the compensation pulse with the increased amplitude to the compensation capacitors.

7. The touch screen driver of claim 1, wherein the offset charge compensation circuit includes a plurality of offset charge compensation circuits respectively connected to the Rx channels on a one-to-one basis such that respective offset compensations are applied to corresponding Rx channels.

8. The touch screen driver of claim 3, wherein the parameter information includes parasitic capacitance of the Tx channels and parasitic capacitance of the Rx channels.

* * * * *